(12) United States Patent
Kazama et al.

(10) Patent No.: US 11,767,469 B2
(45) Date of Patent: Sep. 26, 2023

(54) GROUP-III NITRIDE SEMICONDUCTOR NANOPARTICLES AND PRODUCTION METHOD THEREOF

(71) Applicant: STANLEY ELECTRIC CO., LTD., Tokyo (JP)

(72) Inventors: Takuya Kazama, Tokyo (JP); Wataru Tamura, Tokyo (JP); Yasuyuki Miyake, Tokyo (JP); Takayuki Omori, Tokyo (JP); Atsushi Muramatsu, Miyagi (JP); Kiyoshi Kanie, Miyagi (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 105 days.

(21) Appl. No.: 17/489,172

(22) Filed: Sep. 29, 2021

(65) Prior Publication Data

US 2022/0098480 A1 Mar. 31, 2022

(30) Foreign Application Priority Data

Sep. 30, 2020 (JP) ................................. 2020-164727

(51) Int. Cl.
*C09K 11/62* (2006.01)
*C01B 21/06* (2006.01)
*C09K 11/08* (2006.01)
*C09K 11/64* (2006.01)
*B82Y 20/00* (2011.01)
*B82Y 40/00* (2011.01)

(52) U.S. Cl.
CPC .......... *C09K 11/62* (2013.01); *C01B 21/0602* (2013.01); *C09K 11/0883* (2013.01); *C09K 11/64* (2013.01); *B82Y 20/00* (2013.01); *B82Y 40/00* (2013.01); *C01P 2002/74* (2013.01); *C01P 2002/76* (2013.01); *C01P 2002/77* (2013.01); *C01P 2002/78* (2013.01); *C01P 2004/16* (2013.01); *C01P 2004/24* (2013.01); *C01P 2004/64* (2013.01); *C01P 2004/82* (2013.01); *C01P 2004/84* (2013.01); *C01P 2006/40* (2013.01)

(58) Field of Classification Search
CPC ..... C09K 11/62; C09K 11/64; C09K 11/0883; C01B 21/0602; B82Y 20/00; B82Y 40/00; C01P 2002/74; C01P 2004/16; C01P 2004/24; C01P 2004/64; C01P 2004/82; C01P 2004/84
See application file for complete search history.

(56) References Cited

U.S. PATENT DOCUMENTS

| | | | |
|---|---|---|---|
| 8,552,417 B2 | 10/2013 | Taylor et al. | |
| 9,469,538 B1 | 10/2016 | Scher et al. | |
| 9,773,942 B2 | 9/2017 | Kazama et al. | |
| 10,032,955 B2 | 7/2018 | Kazama et al. | |
| 10,714,337 B2 | 7/2020 | Kim et al. | |
| 10,988,688 B2 | 4/2021 | Kazama et al. | |
| 2007/0297969 A1* | 12/2007 | Van Patten | C01B 21/0632 423/409 |
| 2008/0202383 A1 | 8/2008 | Shi | |
| 2010/0240770 A1* | 9/2010 | Qi | H01L 21/02601 977/773 |
| 2016/0225958 A1 | 8/2016 | Kazama et al. | |
| 2018/0026166 A1 | 1/2018 | Kazama et al. | |
| 2021/0207025 A1 | 7/2021 | Kazama et al. | |

FOREIGN PATENT DOCUMENTS

| | | | |
|---|---|---|---|
| JP | 5847863 B2 | 12/2015 | |
| WO | 2008094292 A1 | 8/2008 | |

OTHER PUBLICATIONS

Extended European Search Report (EESR) dated Mar. 14, 2022, issued in counterpart European Application No. 21199949.5.

* cited by examiner

*Primary Examiner* — C Melissa Koslow
(74) *Attorney, Agent, or Firm* — Holtz, Holtz & Volek PC

(57) ABSTRACT

Provided are group-III nitride nanoparticles that prevent the piezoelectric field caused by strains on the nanoparticles, achieving good luminous efficiency. The group-III nitride nanoparticle represented by $Al_xGa_yIn_zN$ ($0 \leq x, y, z \leq 1$) incorporating two crystal structures; a wurtzite structure and a zincblende structure, in a single particle. As another example, the group-III nitride nanoparticle has a core-shell structure with a core and a shell, in which the particle constituting the core contains two crystal structures; the wurtzite structure and the zincblende structure, in the particle. Nanoparticles containing the two crystal structures can be produced by using a phosphorus-containing solvent as a reaction solvent, and the mixture ratio of the two crystal structures, (wurtzite structure)/(zincblende structure), is 20/80 or higher.

7 Claims, 5 Drawing Sheets

GROUP-III NITRIDE SEMICONDUCTOR NANOPARTICLES AND PRODUCTION METHOD THEREOF

INCORPORATION BY REFERENCE

The present application claims priority from Japanese patent application JP-2020-164727 filed on Sep. 30, 2020, the content of which is hereby incorporated by reference into this application.

BACKGROUND OF THE INVENTION

Field of the Invention

The present invention relates to group-III nitride nanoparticles such as Al, Ga, and In, and in particular to nitride semiconductor nanoparticles that prevent deterioration of luminous efficiency due to a piezoelectric field.

Description of the Related Art

Group-III nitride semiconductor nanoparticles (hereinafter, simply referred to as group-III nitride nanoparticles) are materials expected to be practically used for EL devices such as illumination and a display, light receiving elements such as sensors and solar cells, a photocatalyst for hydrogen production, and so on.

It is known that as main crystal structures of the group-III nitrides, there are a wurtzite structure (hexagonal crystal) and a zincblende structure (cubic crystal). The nanoparticles with the wurtzite structure have asymmetry in the crystal. Therefore, when stress is applied to the crystal and subjected to strain, the balance of polarization of the group-III element having a positive charge and the nitrogen element having a negative charge is lost, resulting in an electric field (piezoelectric field) in the C-axis direction. When the piezoelectric field is generated, the energy band of the group-III nitride nanoparticles bends, and the degree of overlap of wave functions between electrons and holes is reduced, thereby reducing the probability of emission recombination. This deteriorates the luminescence efficiency.

On the other hand, the group-III nitrides with the zincblende structure have no problem of the piezoelectric field due to the asymmetry of the crystal as described above. The zincblende structure in the group-III nitrides is, however, metastable structure and it is difficult to be obtained stably, unlike the wurtzite structure having a stable phase. For example, the Japanese Patent No. 5847863 (hereinafter, referred to as patent document 1) discloses that the group-III nitride nanoparticles and the production method thereof, but it is only described that cubic crystals (zincblende structures) were obtained for some InN cores.

In the case of nanoparticles, when there is anisotropy in the shape of the particle, internal stress is generated within the particle, causing a decrease in luminous efficiency due to the piezoelectric field.

Further, when the group-III nitride nanoparticles are used for the above-mentioned applications, for example, used as nanoparticle fluorophores, the nanoparticle is required to have a core-shell structure, i.e., a core particle coated in a shell, so as to improve luminescence efficiency. This structure, however, may also cause reduction of luminescence efficiency. Specifically, the core and the shell may have different lattice constants, and constituent materials and their ratios may also be different therebetween. Thus these factors may cause internal stress generated in the particle, and in the case of the core-shell structure, the efficiency may further be decreased, as compared with the core structure alone. Furthermore, if there is anisotropy in the shape of the core-shell particle, the core is under stress due to the shape anisotropy, such as rod-shaped anisotropy or disk-shaped anisotropy, incurring a decrease in luminous efficiency due to the piezoelectric field.

SUMMARY OF THE INVENTION

Technical Problem

Problems of the piezoelectric field generated due to differences in the shapes, lattice constants, and compositions, of the aforementioned particles or the core-shell structure, cause deterioration of the luminous efficiency of the group-III nitride nanoparticles, in conjunction with the crystal structure of the wurtzite structure.

An object of the present invention is to solve the problem of luminous efficiency reduction of the group-III nitride nanoparticles due to the piezo electric field, and to provide the group-III nitride nanoparticles that prevent reduction of luminous efficiency, even though the particles have a structure with strain.

Solution to Problem

To solve the problem as described above, the present invention provides group-III nitride nanoparticles, each nanoparticle incorporating two crystal structures; a wurtzite structure and a zincblende structure, in a mixed manner. In addition, the group-III nitride nanoparticles according to the present invention include a particle incorporating the two crystal structures of one composition, and a particle having a core-shell structure comprising as a core, a particle incorporating the two crystal structures of one composition, surrounded by a shell of a composition different from the composition of the core.

Here, "each particle incorporating two crystal structures in a mixed manner" means that individual particles of the group-III nitride nanoparticles made up of a large number of particles, incorporate the two crystal structures in each particle. That is, the two structures are coexistent in each particle.

A production method of the group-III nitride nanoparticles according to the present invention uses group-III nitride materials and a solvent for synthesis of a group-III nitride by pyrolysis, and the method uses a phosphorus-containing solvent as the solvent.

The group-III nitride nanoparticles according to the present invention incorporate the two crystal structures; the wurtzite structure and the zincblende structure, within one particle, whereby crystallographic asymmetry can be alleviated. This allows stabilization of the balance between the polarization of positively charged group-III elements and negatively charged nitrogen elements, controlling the piezoelectric field peculiar to the wurtzite structure, thereby preventing the decrease in luminescence efficiency.

It is also to be noted that the piezoelectric field is generated when the group-III nitride nanoparticles are subjected to strain in the growth plane. Therefore, by applying the present invention to the group-III nitride nanoparticles having factors (shape and composition) that increase the strain, a large effect can be obtained, and the degree of freedom in designing the III nitride nanoparticles is enhanced.

BRIEF DESCRIPTION OF THE DRAWINGS

FIG. 2A shows an elliptical particle, FIG. 2B shows a spherical core shell particle, FIG. 2C shows a rod-shaped core shell particle, and FIG. 2D shows a disk-shaped core shell particle;

DETAILED DESCRIPTION OF THE PREFERRED EMBODIMENTS

There will now be described embodiments of group-III nitride nanoparticles and a production method thereof according to the present invention. The group-III nitride nanoparticle of the present invention is represented by $In_xGa_yAl_zN$ ($0 \leq x, y, z \leq 1$), and one particle incorporates two crystal structures of a wurtzite structure and a zincblende structure in a mixed manner. Since these two crystal structures are coexistent within one particle, strain is less likely to occur under various conditions such as the composition and the shape which tend to give strain to the lattice of the hexagonal, so that high luminous efficiency can be achieved. The state where the two crystal structures are coexistent (incorporated in a mixed manner) within the particle may be calculated, for example, from precision structure analysis such as Rietveld method, or from the intensity ratio between (110) and (103) of the X-ray diffraction pattern.

The Rietveld method is a technique to calculate quantitative values such as lattice constants by fitting the whole diffraction pattern with the least squares method, and a mixture ratio can be calculated from the ratio between the calculated lattice constants, and lattice constant of the wurtzite structure/lattice constant of the zincblende structure. Measurement according to the Rietveld method was performed using the software for crystal structural analysis (TOPAS) available from Bruker.

Figure 1:
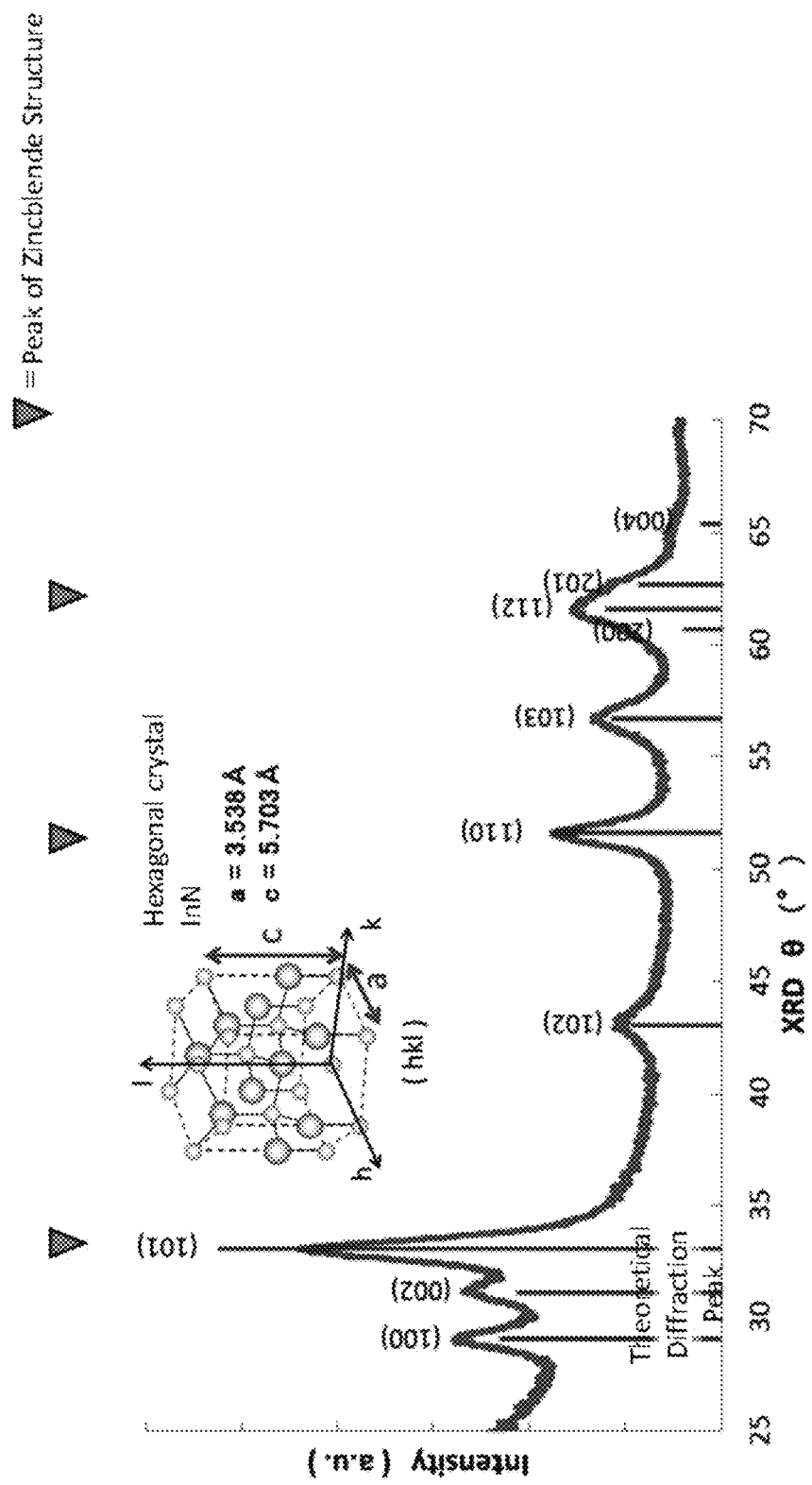
FIG. 1 illustrates an X-ray diffraction pattern of a wurtzite structure.

As shown in FIG. 1, the X-ray diffraction pattern of the wurtzite structure shows that the peak (103), which does not appear in the cubic crystal, at a position easily distinguished from the peak (110). In contrast to this, there is no peak (103) in the vicinity of (110) in the cubic crystal. Therefore, it is possible to confirm that two crystal structures are coexistent in one particle by observing only one particle by a TEM (transmission electron microscope) and calculating from the diffraction patterns, an intensity ratio between the peak of (110) common in the wurtzite structure and in the zincblende structure, and the peak of (103) peculiar to the wurtzite structure.

Furthermore, the X-ray diffraction patterns are measured for a large number of sets of group-III nitride nanoparticles of the present invention, and there is calculated the ratio R of the intensity ratio X1 of the measurement target (a mixed system of crystal structures) to the intensity ratio X0 of (110) and (103) of wurtzite. This allows calculation of the ratio of zincblende in the mixed system, along with calculating the mixture ratio:

$$R = (X1/X0) \times 100$$

Mixture ratio = $R : (100 - R)$

The ratio of the wurtzite structure is preferably 10% or higher, more preferably 20% or higher, and still more preferably 30% or higher. With around 10% of wurtzite, it is impossible to obtain a superior luminous brightness compared with the nitride nanoparticles having the wurtzite structure alone. On the other hand, the ratio of the zincblende structure is preferably 50% or less. By making the ratio of the zincblende structure which is a metastable phase, less than half, the crystal structure of the group-III nitride nanoparticles can be kept stable. The ratio of the zincblende structure can be 25% or higher, or 30% or higher, based on XRD diffraction intensity.

Figure 2C:
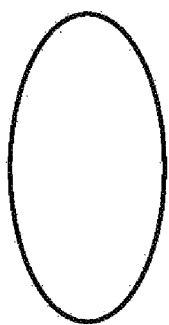
FIGS. 2A to 2D illustrate examples of possible shapes of group-III nitride nanoparticle according to the present invention.
Figure 2D:
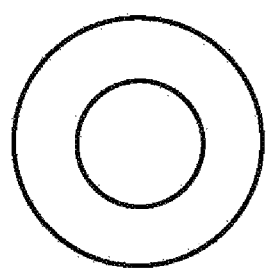
Figure 2A:
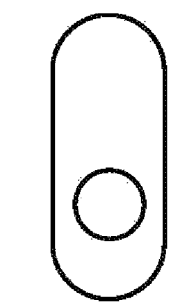
Figure 2B:
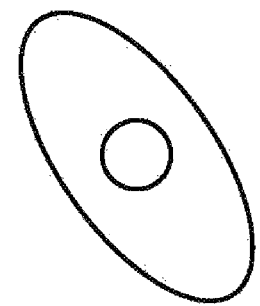

The group-III nitride nanoparticles of the present invention incorporate two crystal structures in a mixed manner within a particle, and thus it is possible to prevent the strain received in the growth plane direction of the crystal, enabling reduction of the piezoelectric field generated when subjected to the strain. There are following two main factors, when divided broadly, which provide strain to the group-III nitride nanoparticles. One of the factors is the shape of the nanoparticle. For example, in the case of a single particle, an elliptical particle as shown in FIG. 2A is liable to cause strain due to its shape anisotropy. In the case of the nanoparticle having the core-shell structure as shown in FIG. 2B, it is ideal, from a viewpoint of strain, that the shell is formed substantially uniformly around the spherical core. However, according to synthesis conditions, a combination of compositions, and other conditions, there may be formed a rod-shaped particle as shown in FIG. 2C, or a disk-shaped particle as shown in FIG. 2D. These shape anisotropy may cause strain. Note that the shape anisotropy referred to here, indicates that the particle has the aspect ratio of 1.1 or more, the aspect ratio being obtained by dividing the maximum diameter by the minimum diameter, when observing the particle by the TEM.

Figure 3:
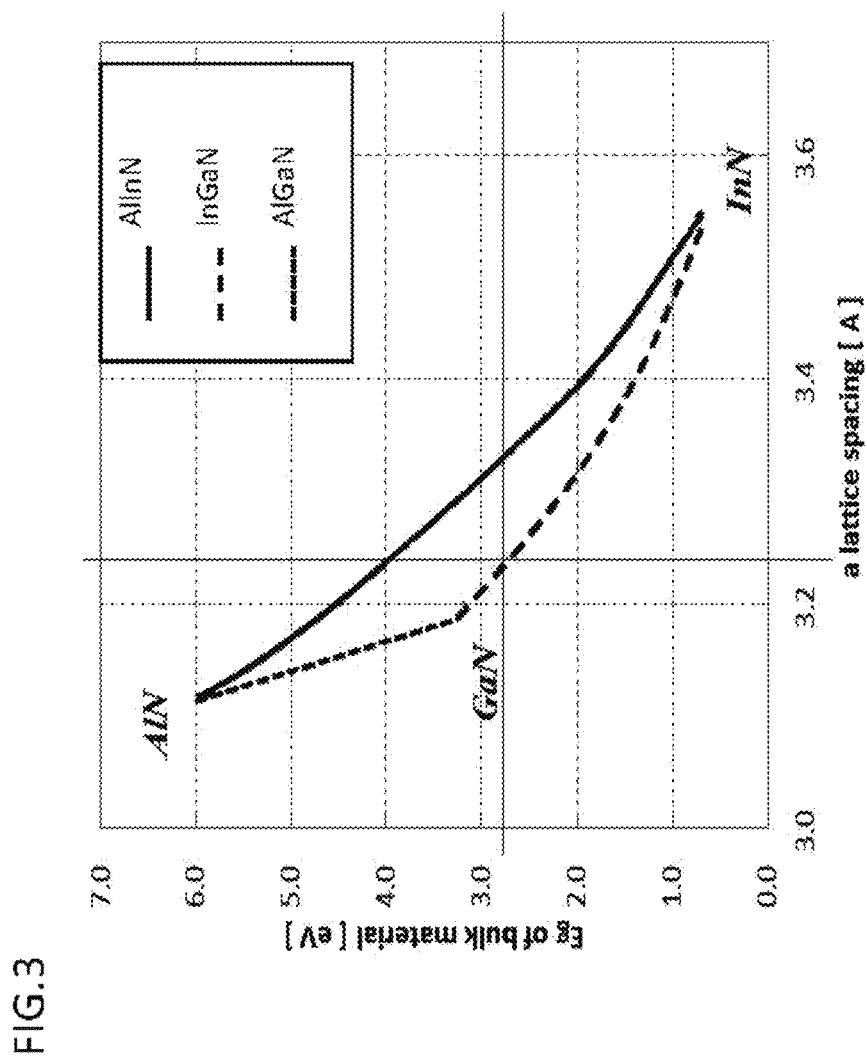
FIG. 3 illustrates a relationship of the composition of the group-III nitride nanoparticle, with energy gap and lattice constant.

The other factor is the lattice mismatch between the core and the shell, caused by the combination of materials in the core-shell structured nanoparticle. In the case of Type 1 quantum dot, a combination of the core and shell is made such that the shell has a larger energy gap relative to the energy gap of the core particle. FIG. 3 illustrates a relationship of the composition of the group-III nitride (bulk crystal), with the energy gap and the lattice constant. In the figure, the lattice constant can be made equal when a combination of the compositions is located on the same line along the vertical axis. In that case, however, there is a limit to enlargement of difference in energy gaps. In the combination that increases the difference in energy gaps, a certain degree of lattice mismatch is unavoidable.

The group-III nitride nanoparticle of the present invention features that the core particle contains the zincblende structure having good symmetry at a predetermined ratio within the particle. Therefore, it is possible to prevent the strain caused by those factors above, thereby increasing the luminous efficiency as compared to the particle having the wurtzite structure alone.

The composition of the group-III nitride nanoparticle is similar to that of conventional group-III nitride, and it may contain any binary nitride such as InN, GaN, AlN, or a ternary nitride represented by $In_xGa_yAl_zN$ (where each of x, y, and z is between or equal to 0 and 1, and satisfy x+y+z=1).

Among the compositions as described above, in the case of the core-shell type nanoparticle having the structure where the core is covered with the shell, this type of particle has a combination of the compositions to form the core and the shell where the energy gap of the shell is larger than the energy gap of the core particle. As shown in FIG. 3, the higher is the ratio of Al, the larger is the energy gap, and the higher is the ratio of In, the smaller is the energy gap. Ga is located therebetween. Therefore, it is preferable to increase the ratio of Al or Ga as the shell material, with a composition of the core which causes a lower energy gap than the shell material.

The composition of the materials of the core and shell may be adjusted considering the lattice matching between them. Also for the lattice matching, a combination of compositions having near lattice constants in the graph of FIG. 3 can achieve the core shell structure with good configuration consistency. However, by making the crystal structures coexistent as aforementioned according to the present invention, it is possible to prevent the strain due to lattice mismatch, as described below, and thus allowing a relatively flexible combination of compositions.

There will now be described an example of a production method of the group-III nitride nanoparticles of the present invention. The group-III nitride nanoparticles of the present invention can basically be produced by chemical synthesis according to a conventional thermal decomposition method (pyrolysis method), and group-III materials and nitrogen materials are reacted at a high temperature together with a predetermined solvent. However, in the conventional chemical synthesis, materials such as tetradecylbenzene, 1-octadecene, trioctylphosphine, diphenyl ether, and benzene may be used as the solvent, but in the present invention, it is preferable to use the phosphorus-containing solvent in order to incorporate the two crystal structures in the particle in a mixed manner. As the solvent of the phosphorus-containing system, materials such as trioctylphosphine (TOP) and trioctylphosphine oxide may be used, and particularly, TOP is preferable.

The solvent may be 100% of phosphorus-containing solvent, or a mixture with the general synthetic solvent described above may be used. However, as the proportion of the phosphorus-containing solvent is larger in the solvent used in the reaction, the ratio of the zincblende structure can be increased. When the proportion of the phosphorus-containing solvent is 100%, the ratio of the zincblende structure may be increased to nearly 40%.

When the group-III materials and the nitrogen materials are synthesized into the group-III nitrides by a chemical reaction, precursors are first formed, and then a nucleation and a crystal growth step proceed to form crystal particles. It is conceivable that the presence of phosphorus of the group V being the same group as nitrogen, in the reaction system at the time of the precursor formation, changes the covalent bonding property of the group-III-V bond, whereby the interatomic distance is changed and this causes partial generation of the zincblende structure.

For the points other than above, conventional production methods can be employed. For example, first the temperature of the materials is raised to around 140° C. to 150° C. at a predetermined temperature rise rate, and reacting the materials for a predetermined time, thereby forming the precursors. Then, the temperature is raised to higher temperature, e.g., around 300° C. to 400° C., and the reaction is advanced to grow the crystals. By controlling this reaction time, the particle diameter of the produced nanoparticles can be controlled.

After particles are generated, centrifugation and centrifugal washing using the solvent such as ethanol are performed to collect nanoparticles. If necessary, a process of imparting dispersibility to the nanoparticles may be performed.

In the case of the core-shell structure, a phosphorus-containing solvent is used to produce the core particle in which crystal structures are coexistent, and then synthesis is performed in the same manner as the core particle, using the core particle, the shell materials, and the solvent. As the solvent for the shell synthesis, the aforementioned general reaction solvent can be used. Thus, it is possible to obtain a nitride nanoparticle having the core-shell structure where the shell covers around the core particle containing the crystal structures mixed therein.

As the group-III materials, materials used in general chemical synthesis can be used, for example, a group-III halide such as indium iodide may be used. It is also possible to use organic materials such as trimethylate and triethylate. As the nitrogen materials, there may be used materials such as ammonia, a metal azide compound, a metal nitride, an amine, and a metal amide. In particular, metallic amides such as sodium amide and lithium amide are preferable.

Since a chemical stoichiometric amount determines the amounts of the group-III materials used for the core and the shell, it is sufficient to use the amounts that form a designated composition. An equivalent or more amount of the nitrogen material relative to the group-III materials is used to obtain the group-III nitride of the intended composition. When the amount of nitrogen (V) material is increased excessively (e.g., V/III=40) and the reaction temperature is set to a high temperature of around 400° C., the shape of the core particle can be made to be elliptical. As for the shell, the amount of nitrogen material (e.g., V/III=40) may be made excessive or high temperature for reaction (during the precursor formation or crystal growth) may be set to around 400° C., thereby controlling the shape of core-shell particle and providing a rod-shaped particle or a disk-shaped particle.

EXAMPLES

There will now be described examples of synthetic methods of the group-III nitride semiconductor nanoparticles according to the present invention. In the following examples, Parr Instrument 4740 was used as a synthetic vessel, and MS-ESB (available from AS ONE Corporation) was used as a heater. This product is a combination of a mantle heater and a stirrer. The synthesis was performed by charging a solvent and materials into an inner cylinder with a lid made of platinum, and placing the inner cylinder in the synthetic vessel, within a glove box where oxygen and moisture concentration was controlled to be 1 ppm or less.

The analysis of the crystal structures in each Example, especially the mixture ratio between the zincblende structure and the wurtzite structure, was calculated from quantification according to precise structure analysis such as the Rietveld method and the intensity ratio between (110) and (103) of XRD (X-ray diffraction) pattern.

Example 1 (InGaN Particles)

As an indium material, 53.5 mg (0.108 mmol) of indium iodide (Aldrich product 99.998%) was used, as a gallium material, 194.6 mg (0.432 mmol) of gallium iodide (Aldrich product 99.99%) was used, and as a nitrogen material, 987.6 mg (43.20 mmol) of lithium amide (Aldrich product 97%) was used. As a solvent, 6 ml of trioctylphosphine (TOP) (Sigma Aldrich product 97%) was used.

Those materials and the solvent were filled in the inner cylinder, and the inner cylinder was placed in the synthetic vessel. Then the synthetic vessel was set in the mantle heater and the temperature was raised to 150° C. at a temperature rise rate of 5° C./min. Solid-phase precursors were formed by the reaction for five minutes, at the temperature ranging from 140° C. to 160° C. Here, in order to uniformly react lithium amide having low solubility in the solvent, stirring was performed with a stirrer bar. The stirring speed was set at 600 rpm. Thereafter, the synthetic vessel was heated to 400° C., and the synthesis was allowed to proceed for one hour. After the synthesis, the vessel was cooled in cold water to rapidly stop the reaction.

After completion of the synthesis, ethanol was added to the synthesized solution, and centrifugation was performed by ultracentrifugation. A supernatant substance after the centrifugation was removed, then ethanol was added again, and centrifugation was performed. After those steps were carried out three times, hexane was added and further centrifugation was performed. Then, finally, centrifugal washing was performed with ethanol to collect particles. The condition of the centrifugation was set at 28000 rpm×30 min.

Figure 4:
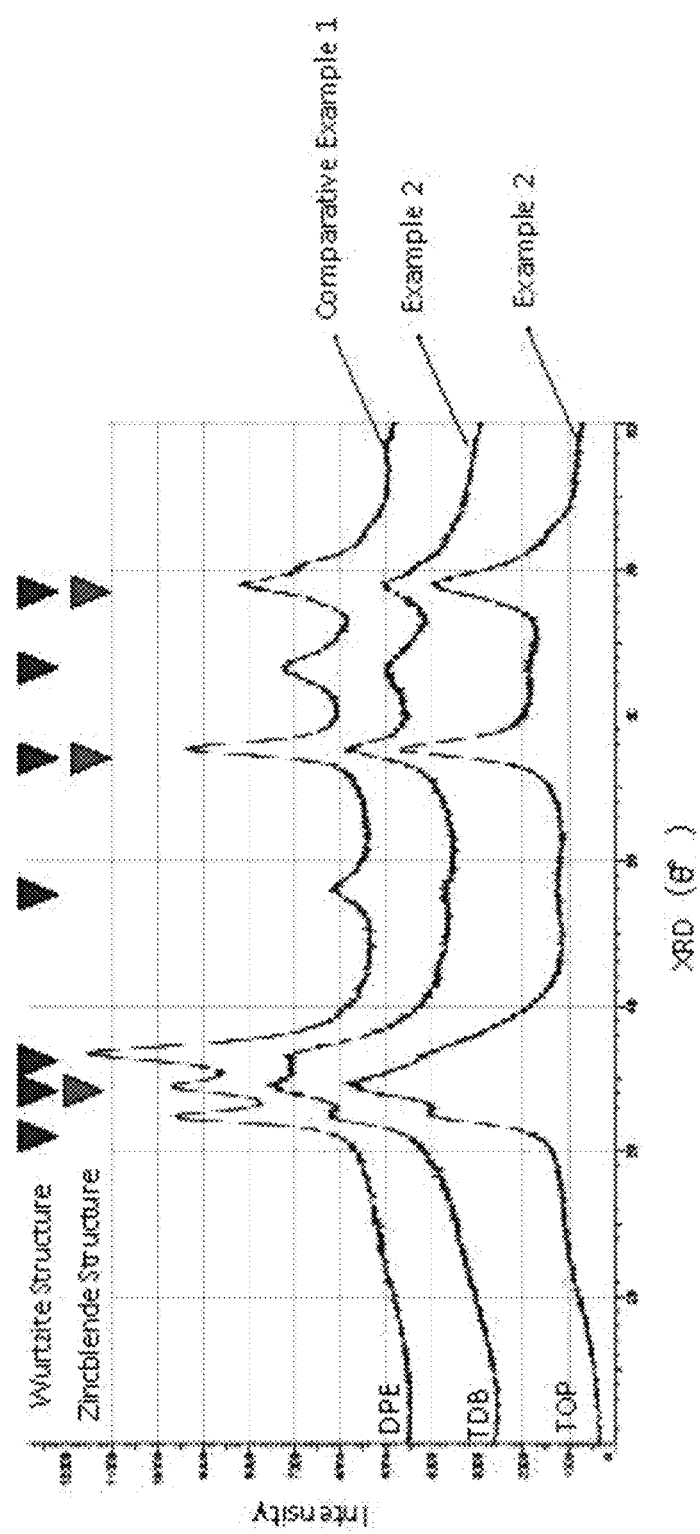
FIG. 4 illustrates the X-ray diffraction patterns of the group-III nitride nanoparticles according to Example 1.

Thus collected particles were measured using the XRD, XRF (X-ray fluorescence), and TEM to evaluate the crystal structure and a particle size, and so on. FIG. 4 shows XRD diffraction patterns of the particles according to Example 1. FIG. 4 also shows the peak positions of the X-ray diffraction patterns of the wurtzite structure and the zincblende structure. From these diffraction patterns, it can be seen that the peaks of the wurtzite structure were blunted and the peaks of the zincblende structure were sharpened. In addition, using the intensity ratios between (110) and (103) of the XRD pattern and the quantification by the precision structure analysis according to the Rietveld method, the mixture ratio of the wurtzite structure and zincblende structure was calculated. As a result, it was found that the particles of Example 1 had the ratio; (wurtzite structure):(zincblende structure)=70:30.

Examples 2, 3, and Comparative Example 1

The solvent to be charged into the reaction vessel (inner cylinder) was made different from the solvent TOP (trioctylphosphine) used in Example 1 as follows, and except that, under the same conditions as Example 1, the nitride particles were synthesized and collected in the same manner as in Example 1.
Comparative Example 1: DPE (Diphenyl Ether)
Example 2: TDB (Tetradecylbenzene)
Example 3: Mixed Solvent of DPE and TOP (DPE:TOP=1: 1)

FIG. 4 shows the XRD diffraction patterns of the particles of Comparative Example 1 and Example 2, together with the result of Example 1. As seen from FIG. 4, the crystal structure of the particles of Comparative Example 1 (solvent:DPE) was 100% wurtzite type. Example 2 (solvent: TDB) indicated an intermediate pattern between Example 1 and Comparative Example 1. The mixture ratio of the wurtzite structure and the zincblende structure calculated in the same manner as Example 1; (wurtzite structure):(zincblende structure) was 90:10 in Example 2, and 80:20 in Example 3, and it was confirmed that both structures were coexistent therein.

Figure 5:
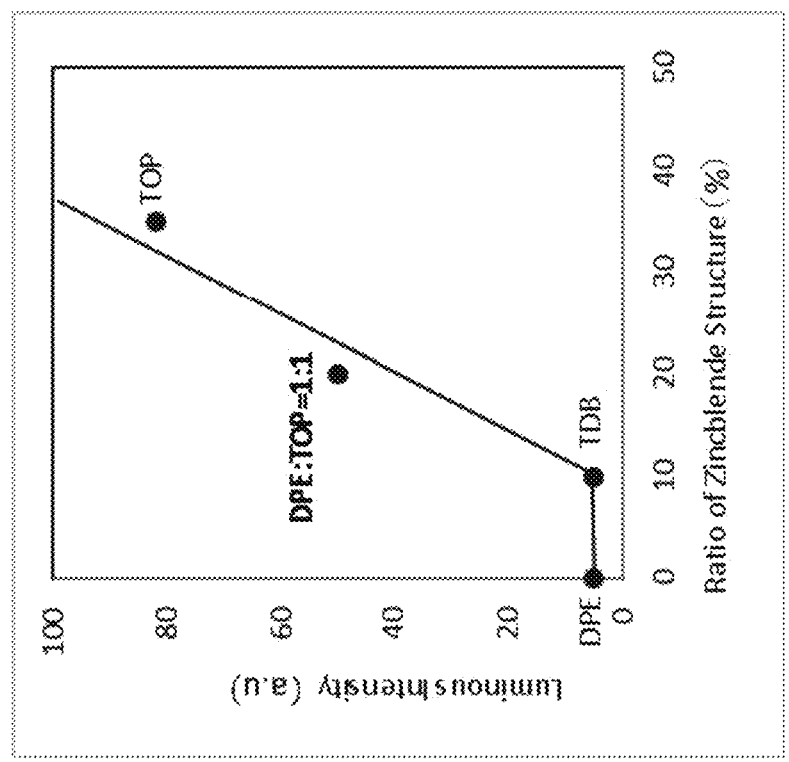
FIG. 5 illustrates a relationship between a crystal structure mixture ratio and luminous intensity of the group-III nitride nanoparticles according to Examples 1 to 3, and Comparative Example.

In addition, luminous intensity of Examples 1 to 3 and Comparative Example 1 was measured using a spectrofluorometer, with the excitation wavelength of 365 nm. FIG. 5 shows the result. As seen from this result, the mixture ratio and the luminous intensity were approximately proportional, and it was found that the higher the ratio of the zincblende structure, the higher the luminous intensity. It can also be seen that the higher the proportion of TOP in the solvent, the higher the proportion of the zincblende structure. In addition, even in Example 2 using TDB as the solvent, there was a mixture of the zincblende structure of about 10%, but the luminescence intensity in this case was not different from that in Comparative Example 1 using DPE. Thus it was confirmed that in the composition of the present Example, the luminescence intensity was improved at a ratio of zincblende structures of more than 10%. Note that the particles produced by the methods of Examples 1, 2, and 3 and Comparative Example 1 had shape anisotropy.

Example 4 (InGaN Core/GaN Shell)

As the indium material, 53.5 mg (0.108 mmol) of indium iodide (Aldrich product 99.998%) was used, as the gallium material, 194.6 mg (0.432 mmol) of gallium iodide (Aldrich product 99.99%) was used, and as the nitrogen material, 246.9 mg (10.80 mmol) of lithium amide (Aldrich product 97%) was used. As the solvent, 6 ml of trioctylphosphine (Sigma Aldrich product 97%) was used.

After filling the aforementioned materials and solvent into the inner cylinder and placing the inner cylinder in the synthetic vessel, synthesis was performed under the same conditions as in Example 1 except that the synthesis temperature was 350° C., then centrifugation and centrifugal washing were performed, and particles were collected. The composition of this particle was $In_{0.2}Ga_{0.8}N$, and the particle size was about 5 nm. The mixture ratio of the wurtzite structure and the zincblende structure calculated from the XRD diffraction pattern, similar to Example 1, was (wurtzite structure):(zincblende structure)=68:32.

Subsequently, the synthesized InGaN nanoparticle was used as the core particle, and then a GaN shell was synthesized. As the materials of the shell, 243.2 mg (0.540 mmol) of gallium iodide (Aldrich product 99.99%) was used as the gallium material, 246.9 mg (10.80 mmol) of lithium amide (Aldrich product 97%) was used as the nitrogen material, and 6 ml of diphenyl ether (Sigma Aldrich product 99%) was used as the solvent.

These shell materials and solvent, and 25.0 mg (0.27 mmol) of InGaN core particles were filled in the inner cylinder, and the inner cylinder was placed in the synthetic vessel. Then the synthetic vessel was set in the mantle heater, and the temperature was raised to 150° C. at a temperature rise rate of 5° C./min. After the reaction for five minutes, at the temperature ranging from 140° C. to 160° C. at the stirring speed of 600 rpm, solid-phase precursors were formed. Thereafter, the synthetic vessel was heated up to 350° C., and after synthesis was performed for one hour, the vessel was cooled with cold water in order to rapidly stop the reaction. After completion of the synthesis, centrifugation and centrifugal washing using ethanol were performed to collect particles, in the same manner as in the particle collection procedure of Example 1. This resulted in obtainment of the core-shell particles, having InGaN as the core and GaN as the shell.

Example 5 (GaN Core/AlGaN Shell)

The composition of the core and the shell was made different, and the core-shell structured nitride nanoparticles were produced as in Example 4.

For the core materials, 243.2 mg (0.540 mmol) of gallium iodide (Aldrich product 99.99%) was used as the gallium material, and 246.9 mg (10.80 mmol) of lithium amide (Aldrich product 97%) was used as the nitrogen material. As in Example 4, 6 ml of trioctylphosphine (Sigma Aldrich product 97%) was used as the solvent, and synthesis was performed in the same manner as in Example 4, and the GaN core particles were collected.

The mixture ratio of the wurtzite structure and the zincblende structure in the core particle was; (wurtzite structure):(zincblende structure)=65:35.

Here, 22.6 mg (0.27 mmol) of the GaN core particles were used, 110.1 mg (0.27 mmol) of aluminum iodide (Aldrich product 99.999%) was used as an aluminum material, 121.6 mg (0.270 mmol) of gallium iodide (Aldrich product 99.99%) was used as the gallium material, 246.9 mg (10.80 mmol) of lithium amide (Aldrich product 97%) was used as the nitrogen material, and 6 ml of diphenyl ether (Sigma Aldrich product 99%) was used as the solvent, whereby $Al_{0.5}Ga_{0.5}N$ shell was formed on the GaN core particle in the same manner as in Example 4, and then the particles were collected.

Examples 6 and 7

The composition of the shell was made different, and nitride nanoparticles having the core-shell structure were produced in the same manner as Example 4 (Example 6: InGaN core/AlInN shell, and Example 7: InGaN core/InGaN shell).

In Example 6, in order to form $Al_{0.8}In_{0.2}N$ shell, 176.1 mg (0.432 mmol) of aluminum iodide (Aldrich product 99.999%) was used as the aluminum material, 53.5 mg (0.108 mmol) of indium iodide (Aldrich product 99.998%) was used as the indium material, and 246.9 mg (10.80 mmol) of lithium amide (Aldrich product 97%) was used as the nitrogen material.

In Example 7, in order to form $In_{0.1}Ga_{0.9}N$ shell, 176.1 mg (0.054 mmol) of indium iodide (Aldrich product 99.998%) was used as the indium material, 53.5 mg (0.486 mmol) of gallium iodide (Aldrich product 99.99%) was used as the gallium material, and 246.9 mg (10.80 mmol) of lithium amide (Aldrich product 97%) was used as the nitrogen material.

In both Examples above, $In_{0.2}Ga_{0.8}N$ core particles were synthesized as in Example 4, and after 25.0 mg (0.270 mmol) of the InGaN core particles were charged into the inner cylinders, respectively with the aforementioned shell materials, and 6 ml of diphenyl ether (Sigma Aldrich product 99%) as the solvent, each of the inner cylinders was placed in the synthetic vessel. Then, the shells were synthesized in the same conditions as in Example 4. Then, there was obtained the particle with the AlInN shell (Example 6) formed onto the InGaN core particle, or the particle with the InGaN shell (Example 7) formed onto the InGaN core particle.

Example 8 (Rod)

Using the InGaN core particles (25.0 mg (0.27 mmol) of $In_{0.2}Ga_{0.8}N$ core particles) that were synthesized in the same manner as in Example 4, GaN shells were synthesized. The ratio of the group-III (Ga) and the Group V (nitrogen) used in synthesis were made different, and rod-shaped shells were synthesized.

That is, 243.2 mg (0.540 mmol) of gallium iodide (Aldrich product 99.99%) was used as the gallium material, and 987.6 mg (43.20 mmol) of lithium amide (Aldrich product 97%) was used as the nitrogen material. As the solvent, 6 ml of diphenyl ether (Sigma Aldrich 99%) was used. After completion of the synthesis, centrifugation and centrifugal washing were performed in the same manner as in Example 4, and particles were collected.

Example 9 (Disk)

Using the InGaN core particles synthesized as in Example 4, disk-shaped shells were synthesized by controlling the synthesis temperature of the shell.

In the present Example, the core composition and the shell composition were the same as in Example 4, and upon synthesizing the shell, the synthesis was carried out for one hour at the temperature raised to 400° C. after the formation of the precursors, though it was 350° C. in Example 4. Except that, the conditions were the same as in Example 4, and the core-shell particles with the GaN shells formed on the InGaN core particles were obtained.

According to Examples as described above, it was confirmed that there were produced the group-III nitride nanoparticles in which two crystal structures; the wurtzite structure and the zincblende structure, were coexistent in the particle. It was also confirmed that the shape of the particle could be controlled, by controlling the ratio (V/III) between the group-III materials and the nitrogen materials used for synthesis and/or the reaction temperature, thereby realizing production of the group-III nitride nanoparticles in the shape such as the elliptical shape and the rod shape.

What is claimed is:

1. A group-III nitride semiconductor nanoparticle represented by $Al_xGa_yIn_zN$ (0≤x, y, z≤1), comprising two crystal structures in a single particle, wherein the two crystal structures are a wurtzite structure and a zincblende structure, and wherein the group-III nitride semiconductor nanoparticle has an elliptical shape or a rod-like shape.

2. The group-III nitride semiconductor nanoparticle according to claim 1, wherein the particle comprising the two crystal structures in the single particle has a ratio of the zincblende structure in a range of 25% to 50% based on XRD diffraction intensity.

3. The group-III nitride semiconductor nanoparticle according to claim 2, wherein the particle comprising the two crystal structures in the single particle has the ratio of the zincblende structure in a range of 30% to 50% based on XRD diffraction intensity.

4. A group-III nitride semiconductor nanoparticle having a core-shell structure formed of a core and a shell, wherein a particle constituting the core comprises two crystal structures within the particle, and wherein the two crystal structures are a wurtzite structure and a zincblende structure.

5. The group-III nitride semiconductor nanoparticle according to claim 4, wherein the core and the shell have different lattice constants.

6. The group-III nitride semiconductor nanoparticle according to claim 4, having a rod-like shape, or a disk-like shape.

7. The group-III nitride semiconductor nanoparticle according to claim 4, wherein the particle comprising the two crystal structures within the particle has a ratio of the zincblende structure in a range of 25% to 50% based on XRD diffraction intensity.

* * * * *